(12) United States Patent
Meinke

(10) Patent No.: US 6,431,630 B1
(45) Date of Patent: Aug. 13, 2002

(54) TAILGATE ASSEMBLY

(75) Inventor: Joseph S. Meinke, Gowen, MI (US)

(73) Assignee: Adac Plastics, Inc., Grand Rapids, MI (US)

( * ) Notice: Subject to any disclaimer, the term of this patent is extended or adjusted under 35 U.S.C. 154(b) by 0 days.

(21) Appl. No.: 09/814,145

(22) Filed: Mar. 21, 2001

(51) Int. Cl.⁷ .............................................. B60P 1/267
(52) U.S. Cl. ....................... 296/50; 296/57.1; 296/901
(58) Field of Search ...................... 296/50, 57.1, 146.7, 296/901, DIG. 3, 39.2

(56) References Cited

U.S. PATENT DOCUMENTS

| | | | |
|---|---|---|---|
| 701,884 A | | 6/1902 | Hon |
| 2,489,957 A | | 11/1949 | Davis |
| 3,387,406 A | * | 6/1968 | Coker et al. ................... 296/50 |
| 3,567,274 A | * | 3/1971 | Kaptur, Jr. et al. ........... 296/50 |
| 3,749,440 A | * | 7/1973 | Lathers ....................... 296/57.1 |
| 4,143,904 A | * | 3/1979 | Cooper et al. ............. 296/57.1 |
| 4,529,244 A | * | 7/1985 | Zaydel ........................ 296/901 |
| 4,707,016 A | * | 11/1987 | McDonald ................. 296/39.2 |
| 5,265,450 A | * | 11/1993 | Doyle ........................ 296/57.1 |
| 5,372,397 A | * | 12/1994 | Arndt ......................... 296/57.1 |
| 5,451,089 A | * | 9/1995 | Bender ........................ 296/50 |
| 5,711,569 A | * | 1/1998 | Sovoda ....................... 296/57.1 |
| 5,741,039 A | * | 4/1998 | Habdas ....................... 296/57.1 |
| 5,944,373 A | * | 8/1999 | Seksaria et al. ............... 296/50 |
| 5,947,540 A | * | 9/1999 | Pariseau et al. ............... 296/50 |
| 6,019,418 A | * | 2/2000 | Emerling et al. ......... 296/146.7 |
| 6,030,019 A | * | 2/2000 | Stiltner et al. ............. 296/57.1 |
| 6,209,366 B1 | * | 4/2001 | Zagoroff ................ 292/DIG. 3 |

FOREIGN PATENT DOCUMENTS

| | | | |
|---|---|---|---|
| JP | 59 186784 | * | 10/1984 |
| JP | 6 255367 | * | 9/1994 |

\* cited by examiner

Primary Examiner—Kiran B. Patel
(74) Attorney, Agent, or Firm—Young & Basile, P.C.

(57) ABSTRACT

A tailgate assembly for a pickup truck including an outer tailgate assembly, an inner tailgate module, and attachment means for securing the inner tailgate module to the outer tailgate assembly to form the completed tailgate. The outer tailgate assembly is formed in a metal forming operation of sheet metal material and the inner panel module is formed in a molding operation of a plastics material. The inner panel module mounts the handle assembly, the latch devices, and the linkage devices for actuation of the latch devices. The latch devices are initially positioned on the inner tailgate module but, following assembly of the inner tailgate module to the outer tailgate assembly, the latch devices are fixedly secured to the outer structural sidewalls defined by the outer tailgate assembly.

15 Claims, 5 Drawing Sheets

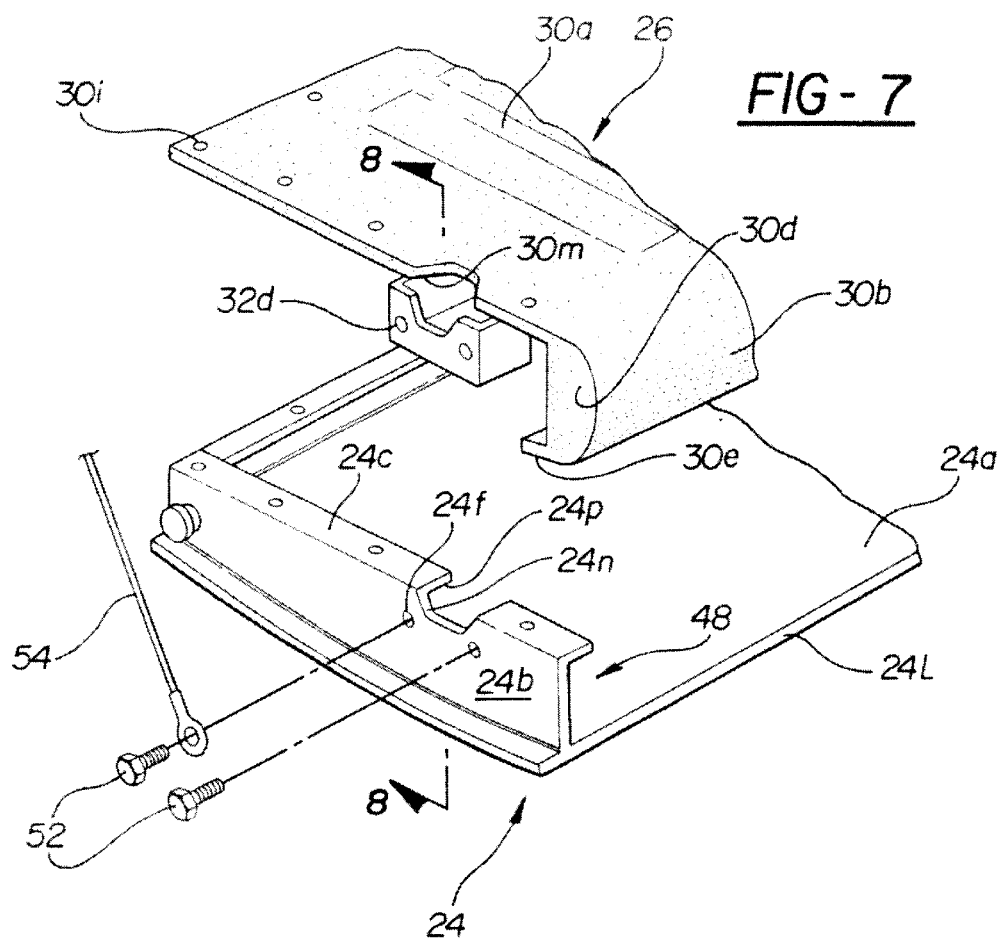
FIG-7
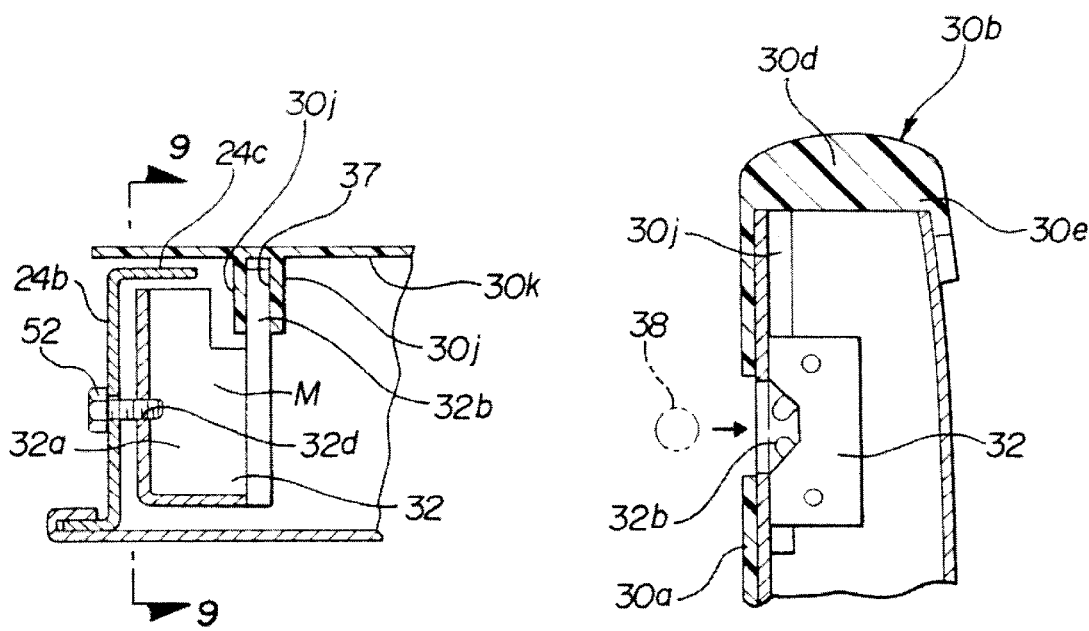
FIG-8
FIG-9

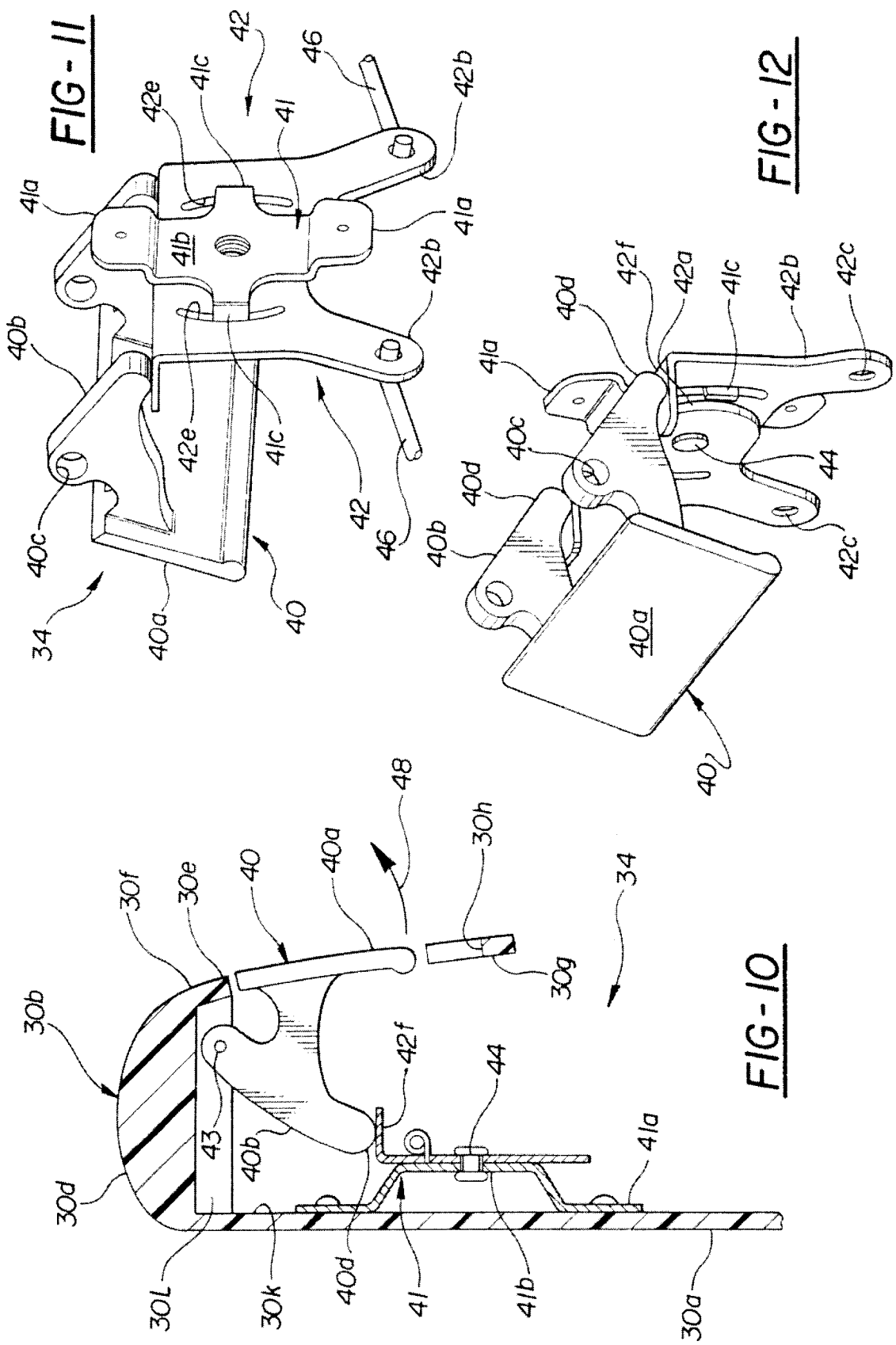

TAILGATE ASSEMBLY

BACKGROUND OF THE INVENTION

This invention relates to motor vehicles of the pickup type and, more particularly, to a tailgate assembly for use with a motor vehicle of the pickup type.

The pickup truck is among the most popular of vehicles sold. It includes a cabin, a bed section for carrying cargo, and a swinging tailgate to retain cargo in the bed. The tailgate assembly is typically formed in a metal forming operation from stamped metal panels which are welded together to form the tailgate. Then latches are added on either side of the tailgate to engage strikers on the pickup sides and a handle is provided to operate the latches to open and close the tailgate assembly and allow the tailgate to move between a raised position in which the tailgate closes the pickup bed and a lowered position and in which the tailgate acts as a loading platform for the bed. Whereas these prior art tailgate assemblies provide a durable and secure closure for the pickup bed and are generally satisfactory, their manufacture is extremely labor and tooling intensive with the result that the tailgate assembly represents an extremely expensive component of the overall vehicle.

SUMMARY OF THE INVENTION

This invention is directed to an improved tailgate for a pickup truck.

More particularly, this invention is directed to a tailgate which may be inexpensively formed.

Yet, more particularly, this invention is directed to a tailgate which utilizes a modular construction to simplify the formation of the tailgate and reduce the cost of the tailgate.

The invention relates both to an improved method of forming a tailgate assembly and to an improved tailgate assembly apparatus.

According to the improved methodology, an outer panel assembly is formed, including an outer planar vertical panel and attachment means; an inner panel module is formed, including an inner panel member having a planar vertical portion, latch devices positioned proximate opposite side edges of the planar vertical portion, a handle assembly mounted on the inner panel member, linkage means operatively interconnecting the handle assembly and the latch devices, and attachment means configured for coaction with the outer panel assembly attachment means; and the inner panel module is attached to the outer panel assembly utilizing the coacting attachment means to define a completed tailgate assembly having spaced inner and outer panels with the latch devices positioned at opposite sides of the tailgate assembly and the linkage means positioned between the inner and outer planar panels. This arrangement reduces the labor and tooling intensity of the tailgate construction and thereby reduces the cost of the tailgate.

According to a further feature of the invention methodology, the inner panel member further includes a header portion secured to an upper end of the planar vertical portion at right angles to the planar vertical portion. This arrangement allows the header portion to form the top panel of the completed tailgate assembly whereby to further simplify the construction of the tailgate.

According to a further feature of the invention methodology, the inner panel member, including the planar vertical portion and the header portion, is formed in a molding operation as a unitary molded member. The use of molding technology, as opposed to metal forming technology, further reduces the cost of the completed tailgate assembly.

According to a further aspect of the invention methodology, the outer panel assembly is formed in a metal forming operation of sheet metal material. The use of metal forming technology to form the outer panel assembly in combination with the use of molding technology to form the inner panel module results in a tailgate assembly that is structurally adequate and yet relatively inexpensive to produce.

According to a further feature of the invention methodology, the outer panel assembly further includes side panel portions which form the side panels of the completed tailgate assembly; the latch devices of the inner panel module are positioned on but not fixedly secured to the planar vertical portion of the inner panel member; and the latch devices in the completed tailgate assembly are fixedly secured to respective side panels. This arrangement allows the latch devices to be provided as a part of the preassembled inner module while allowing the latch devices to be ultimately fixedly secured to the structural side panels of the tailgate.

According to a further feature of the invention methodology, each side panel portion defines an inboard facing vertically extending channel proximate a respective side edge of the outer panel assembly; the inner panel module is assembled to the outer panel assembly by sliding the inner panel module relative to the outer panel to position the respective latch devices in the respective channels; and the coacting attachment means are thereafter utilized to fixedly secure the inner panel module to the outer panel assembly. This methodology assures the ready and positive locating of the latch devices relative to the structural side panels of the completed tailgate assembly.

The invention further provides a tailgate module for combination with a tailgate outer panel assembly to form a tailgate. The module comprises an inner panel member having a planar vertical portion; latch devices positioned proximate opposite sides edges of the planar vertical portion; a handle assembly mounted on the inner panel member; linkage means operatively interconnecting the handle assembly and the latch devices; and attachment means for securing the module to the outer panel assembly to form the tailgate. This arrangement allows the module to be preassembled and predressed at a location remote from the metal forming facility where the outer panel assembly is fabricated whereby to simplify the assembly and reduce the cost of the completed tailgate assembly.

According to a further feature of the invention methodology, the tailgate outer panel assembly includes an outer panel having a central notch formed in an upper edge thereof; the handle assembly includes a handle; the inner panel member further includes a header portion secured to an upper end of the planar vertical portion; the header portion includes an elongated main body portion secured to the upper edge of the planar vertical portion; and a handle portion downstanding centrally from the main body portion, sized to fit in the central notch of the outer panel, and defining a handle opening; and the handle is positioned in the handle opening. This arrangement allows the inner panel member to form a housing structure to receive the handle of the handle assembly.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 7 is a fragmentary perspective, exploded view of the tailgate assembly;

FIG. 8 is a fragmentary detailed view of the tailgate assembly;

FIG. 9 is a cross sectional view taken on Line 9—9 of FIG. 8;

FIG. 10 is a cross sectional view taken on Line 10—10 of FIG. 6; and

FIGS. 11 and 12 are perspective views of a handle assembly utilized in the tailgate assembly.

DESCRIPTION OF THE PREFERRED EMBODIMENT

Figure 1:
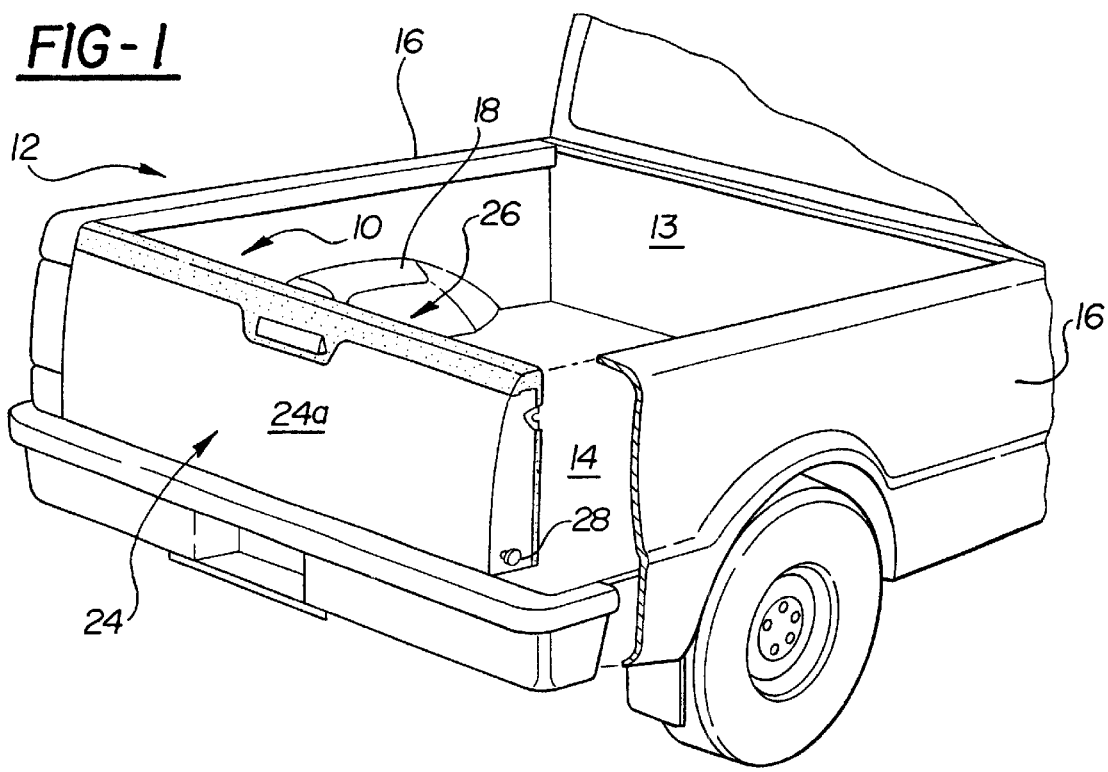
FIG. 1 is a fragmentary perspective view of a pickup truck embodying a tailgate assembly according to the invention and showing the tailgate assembly in a raised position.
Figure 2:
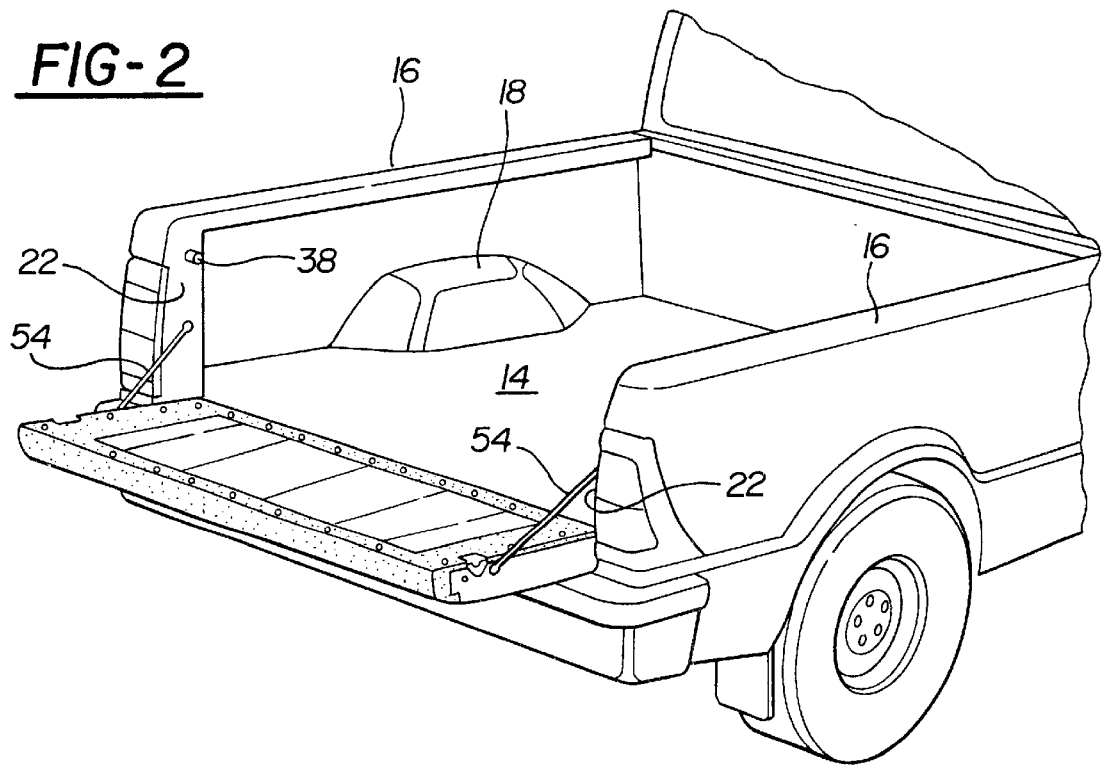
FIG. 2 is a view similar to FIG. 1 but showing the tailgate assembly in a lowered position.

The tailgate assembly 10 according to the invention is seen in FIG. 1 in association with a fragmentarily shown motor vehicle 12 of the pickup type, including a cabin 13, a pickup bed 14, sidewalls 16, wheel housings 18, and a rear bumper 20. Tailgate assembly 10 is sized to fit in a tailgate opening 22 (FIG. 2) defined by sidewalls 16 and bed 14 and is pivotally movable in known manner between the raised or closed position seen in FIG. 1 and the lowered position seen in FIG. 2.

Tailgate assembly 10, broadly considered, includes an outer panel assembly 24 and an inner panel module 26.

Figure 4:
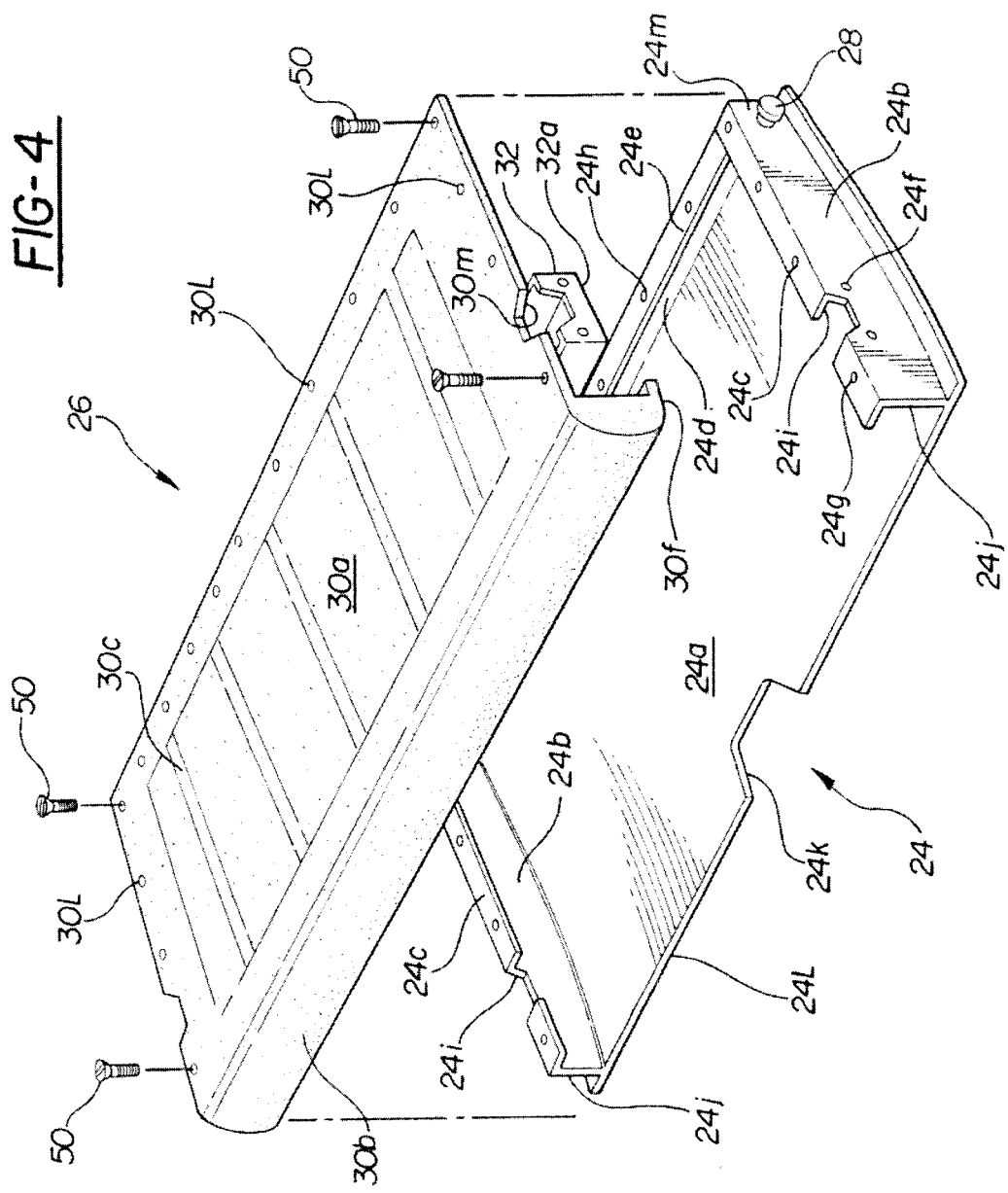
FIG. 4 is an exploded perspective view of the tailgate assembly.
Figure 3:
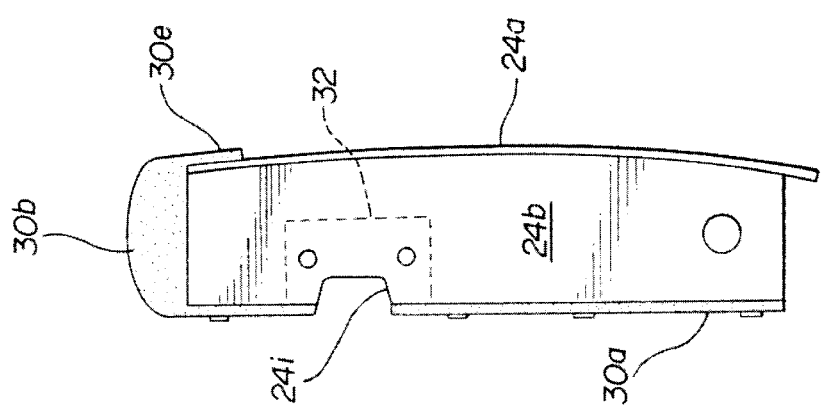
FIG. 3 is an end view of the tailgate assembly.
Figure 5:
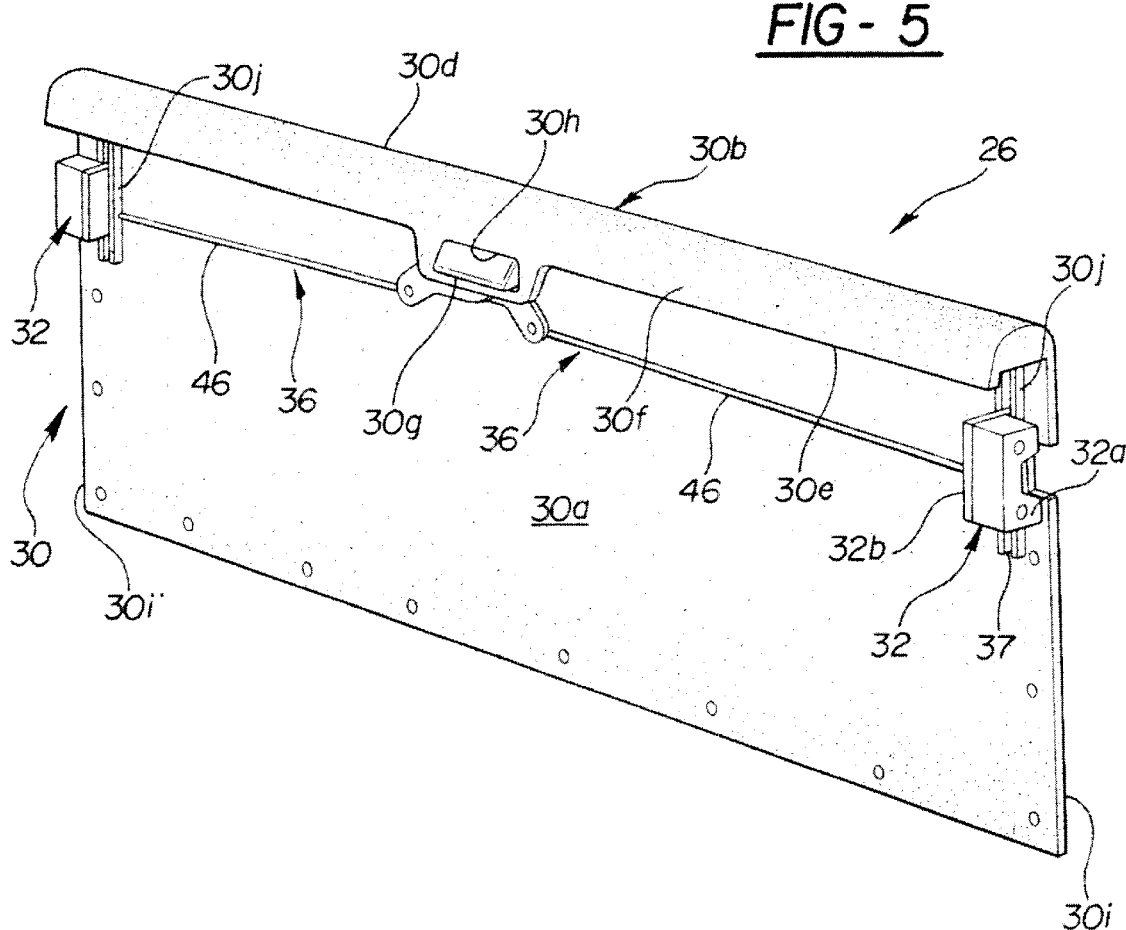
FIG. 5 is a perspective view of an inner panel module forming a part of the tailgate assembly.
Figure 6:
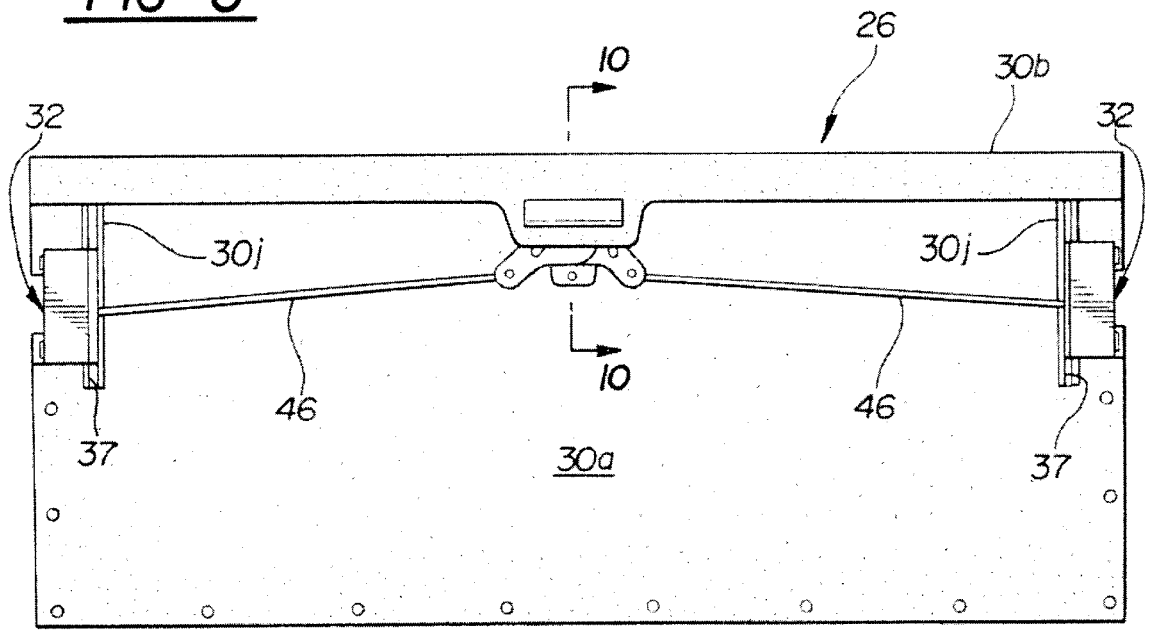
FIG. 6 is an elevational view of the inner panel module.

Outer panel assembly 24 (FIGS. 4 and 7) is formed of sheet metal in a metal forming, welding operation and includes an outer planar panel 24a, side panels 24b including lip portions 24c, a lower panel 24d including a lip portion 24e adjoining lip portions 24c, pivot pins 28, and attachment means in the form of apertures 24f in side panels 24b, apertures 24g in lip portions 24c, and apertures 24h in lip portion 24e. A cutout or notch 24i is formed in each sidewall 24b proximate the upper edge 24j of the sidewall and a central notch 24k is formed in the upper edge 24l of the outer panel 24a. Pivot pins 28 are secured to the respective sidewalls 24b proximate the lower ends 24m of the sidewalls and coact in known manner with suitable journals in the sidewalls of the pickup truck to mount the tailgate for pivotal movement between its raised and lowered positions.

Inner panel module 26 (FIGS. 4–7) includes an inner panel member 30, latch devices 32, a handle assembly 34, and linkage means 36.

Inner panel member 30 is formed in a molding operation of a suitable plastics material such, for example, as nylex, and includes a planar vertical panel portion 30a and a header portion 30b. Planar panel portion 30a may be provided with ribbing 30c to increase the stiffness of the panel and to coact with similar ribbing on the pickup bed 14.

Header portion 30b is integrally molded with planar panel portion 30a and, specifically, is integral with the upper edge of the planar vertical portion and extends at right angles to the planar vertical portion. Header portion is laterally coextensive with planar panel portion 30a and includes an elongated main body portion 30d, a lip portion 30e extending downwardly from the rear edge 30f of the main body portion 30d, and a handle portion 30g downstanding centrally from the rear edge of the main body portion, sized to fit in the central notch 24k of outer panel 24a, and defining a handle opening 30h.

A latch device 32, including a suitable generally rectangular sheet metal housing 32a, is positioned proximate each side edge 30i of inner panel 30a directly under header main body portion 30d. Each latch device 32 is maintained in position relative to panel 30a by a tongue and groove arrangement best seen in FIG. 8. Specifically, the housing 32a of each latch device 32 includes a tongue portion 32b which is received with a friction fit in a groove 37 defined between spaced integral ribs 30j provided on the rear or inner face 30k of the panel 30a. Each latch device 32, in known manner, includes a latch member 32b (FIG. 9) pivotally mounted within housing 32a and arranged for coaction with a striker 38 positioned on a respective sidewall of the pickup truck whereby to latch and unlatch the tailgate with respect to the body of the pickup truck.

Handle assembly 34 (FIGS. 5, 6, 10, 11, and 12) includes a handle 40, a bracket 41, and left and right actuator levers 42.

Handle 40 includes a rectangular base plate portion 40a sized to fit in handle opening 30h and laterally spaced crank arm portions 40b. Handle 40 is pivotally mounted on the header portion 30b of the inner panel member by a pivot pin 43 mounted in spaced ribs 30l formed integrally with the lower face of header portion 30b and passing through apertures 40c in the handle crank arm portions 40b.

Bracket 41 is secured to the inner face 30k of inner panel 30a and includes upper and lower mounting ears 41a, a central platform 41b, and arms 41c projecting laterally from diametrically opposed locations on platform 41b.

Each actuator lever 42 includes a main body portion 42a pivotally mounted on a pivot pin 44 mounted on platform 41b, an arm portion 42b defining an aperture 42c, an arcuate slot 42e slidingly and guidingly receiving a respective bracket arm 41c, and a finger portion 42f underlying the free end 40d of a respective crank arm 40b.

Linkage means 36 includes a link member 46 extending between a respective actuator lever arm portion 42b and a respective latch device 32. Upward pivotal movement of handle 40 in the direction of the arrow 48 in FIG. 10 will be seen to act through crank arm free ends 40d and fingers 42f to rotate left and right actuator levers 42 in opposite directions about pivot pin 44 whereby to actuate links 46 in a manner to release latch members 32b from strikers 38 and allow opening downward pivotal movement of the gate. A return spring, not shown, acts in known manner to return the handle assembly to its rest position upon release of the handle.

ASSEMBLY

In a typical manufacturing scenario, the outer tailgate assembly 24 would be formed of sheet metal in a metal forming operation performed at a metal forming facility and the inner panel module would be formed at a separate location and/or facility specializing in molding operations, whereafter the outer panel assembly and inner panel module would be brought together for assembly to form the completed tailgate assembly.

To form the completed tailgate assembly, the inner panel module is positioned above the outer panel assembly and slid relative to the outer panel assembly to bring the inner and outer assemblies into coextensive relationship. Specifically, (FIGS. 7 and 8) the inner and outer panel assemblies are slid relatively to slide each latch device housing 32a into an inwardly facing vertically extending channel 48 defined proximate a respective side edge of the outer panel assembly to position each latch housing beneath an upper end portion of a respective lip 24c with a cutout 32c in the latch housing aligning with cutouts 24n in the respective side panel 24b, a cut out 24p in the respective lip 24c, and a cut out 30m in the respective side edge 30i of the panel 30a to allow access of the respective striker 38 to the latch member 32b. As the inner panel module slides into place relative to the outer panel assembly, the lip 30e of the header portion of the inner panel member slides into position over the upper edge 24l of the outer panel 24a to hide the unfinished upper edge of that panel and provide a finished appearance to the tailgate assembly. Once the inner panel module is in place relative to the outer panel assembly, fasteners 50 are passed downwardly through apertures 30l in panel 30a for coaction with apertures 24g in lips 24c and apertures 24h in lip 24e, and fasteners 52 are fastened through apertures 24f in sidewalls 24b for engagement with threaded bores 32d provided in the outboard walls of latch housings 32a whereby to draw the latch housings outwardly as allowed by the flexibility of the ribs 30j into fixed engagement with the metal sidewalls 24b to positively and rigidly position the latch devices relative to the outer tailgate assembly and relative to the associated cutouts 24n, 24p and 30m, whereby to assure a smooth, positive functioning of the latch device. Apertures 24h and 24g may be threaded for threaded receipt of fasteners 50 or, alternatively, fasteners 50 may coact with nuts positioned beneath lips 24c and 24e to fixedly secure the inner panel member to the outer panel assembly.

One of the fasteners 52 may also be utilized (FIG. 7) to secure the outboard end of a cable 54 to each side of the tailgate so that, with the inboard ends of the cables secured to the body of the pickup truck, the cables may act in known manner to define the lowered position of the tailgate.

The invention methodology and apparatus will be seen to significantly reduce the cost of producing a pickup tailgate without derogating the quality and/or strength of the gate. Specifically, the cost of tooling and fabricating the metal tailgate is significantly reduced by utilizing the preassembled and predressed molded inner module, and the labor cost of assembling the tailgate is reduced by allowing a preassembled, predressed inner molded module, fabricated at a facility specializing in molding operations, to be readily combined with the sheet metal outer panel assembly to form the final tailgate assembly.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of forming a tailgate assembly for a motor vehicle comprising the steps of:

forming an outer panel assembly including an outer planar vertical panel having an inboard face and an outboard face and attachment means;

forming an inner panel module including an inner panel member having a planar vertical portion including an inboard face and an outboard face, latch devices positioned proximate opposite side edges of the planar vertical portion and secured to the inboard face of the planar vertical portion, a handle assembly mounted on the inner panel member proximate the inboard face thereof, linkage means operatively interconnecting the handle assembly and the latch devices, and attachment means configured for coaction with the outer panel assembly attachment means;

positioning the inboard face of the outer panel proximate the inboard face of the planar vertical portion of the inner panel member to position the latch devices, and assembly, and linkage means between the outer panel and the planar vertical portion of the inner panel member; and attaching the inner panel module to the outer panel assembly utilizing the coacting attachment means to define a completed tailgate assembly having spaced inner and outer panels with the latch devices positioned at opposite sides of the tailgate assembly and the linkage means positioned between the inner and outer planar panels.

2. A method according to claim 1 wherein the inner panel member further includes a header portion secured to an upper end of the planar vertical portion at right angles to the planar vertical portion and forming a top panel of the completed tailgate assembly.

3. A method according to claim 2 wherein the inner panel member, including the planar vertical portion and the header portion, is formed in a molding operation as a unitary molded member.

4. A method according to claim 1 wherein the outer panel assembly further includes side panel portions which form the side panels of the completed tailgate assembly.

5. A method according to claim 4 wherein;

in the inner panel module, the latch devices are positioned on but not fixedly secured to the planar vertical portion of the inner panel member; and in the completed tailgate assembly, the latch devices are fixedly secured to respective side panels.

6. A method according to claim 5 wherein:

each side panel portion defines an inboard facing vertically extending channel proximate a respective side edge of the outer panel assembly;

the inner panel module is assembled to the outer panel assembly by sliding the inner panel module relative to the outer panel to position the respective latch devices in the respective channels; and the coacting attachment means are thereafter utilized to fixedly secure the inner panel module to the outer panel assembly.

7. A method according to claim 6 wherein the attachment means includes means fixedly securing each latch device to a respective side panel portion.

8. A method according to claim 1 wherein:

the outer panel assembly is formed in a metal forming operation of sheet metal material;

the inner panel module is formed in a molding operation of a plastic material.

9. A tailgate module for combination with a tailgate outer panel assembly to form a tailgate, the module comprising:

an inner panel member having a planar vertical portion;

latch devices positioned proximate and secured to opposite side edges of the planar vertical portion;

a handle assembly mounted on the inner panel member;

linkage means operatively interconnecting the handle assembly and the latch devices; and attachment means for securing the module to the outer panel assembly to form the tailgate;

the module being preassembled and predressed for subsequent combination with the tailgate outer panel to form the tailgate.

10. A tailgate module according to claim 9 wherein the inner panel is formed in a molding operation of a plastics material.

11. A tailgate module according to claim 9 wherein the inner panel member further includes a header portion secured to an upper end of the planar vertical portion and extending in the completed tailgate from the upper edge of the planar vertical portion to an upper edge of the tailgate outer panel to form the top wall of the completed tailgate.

12. A tailgate module according to claim 11 wherein the tailgate outer panel assembly includes an outer panel having a central notch formed in an upper edge thereof and wherein:

the handle assembly includes a handle;

the header portion includes an elongated main body portion secured to the upper edge of the planar vertical portion and a handle portion downstanding centrally from the main body portion, sized to fit in the central notch of the outer panel, and defining a handle opening; and the handle is positioned in the handle opening.

13. A tailgate assembly comprising:

an outer tailgate assembly including an outer tailgate panel formed of a sheet metal and attachment means; and an inner tailgate assembly including an inner tailgate panel formed of a non metallic material and attachment means for coaction with the outer tailgate assembly attachment means to secure the assemblies together to form the tailgate assembly.

14. A tailgate assembly according to claim 13 wherein the inner tailgate assembly further includes latch devices positioned proximate opposite side edges of the inner panel, a handle assembly, and linkage means operatively interconnecting the handle assembly and the latch devices.

15. A tailgate assembly according to claim 14 wherein:

the outer tailgate assembly further includes sheet metal side panels; and the outer and inner tailgate attachment means include fastener means fixedly securing each latch device to a respective side panel.

* * * * *